United States Patent
Montalvo et al.

(10) Patent No.: US 11,845,895 B2
(45) Date of Patent: Dec. 19, 2023

(54) METHODS OF ENSURING AND ENHANCING CONDUCTIVITY IN MICRO-FRACTURES

(71) Applicant: Halliburton Energy Services, Inc., Houston, TX (US)

(72) Inventors: Janette Cortez Montalvo, Porter, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/726,044

(22) Filed: Apr. 21, 2022

(65) Prior Publication Data
US 2022/0243119 A1 Aug. 4, 2022

Related U.S. Application Data

(63) Continuation of application No. 16/959,838, filed as application No. PCT/US2018/017559 on Feb. 9, 2018, now Pat. No. 11,365,346.

(51) Int. Cl.
*C09K 8/80* (2006.01)
*C09K 8/68* (2006.01)
(Continued)

(52) U.S. Cl.
CPC .................. *C09K 8/80* (2013.01); *C09K 8/68* (2013.01); *C09K 8/90* (2013.01); *E21B 43/267* (2013.01);
(Continued)

(58) Field of Classification Search
CPC ... C09K 8/80; C09K 8/68; C09K 8/90; C09K 2208/28; E21B 43/267
See application file for complete search history.

(56) References Cited

U.S. PATENT DOCUMENTS 6,367,548 B1 * 4/2002 Purvis ..................... E21B 43/25
166/50
7,275,596 B2 10/2007 Willberg et al.
(Continued)

FOREIGN PATENT DOCUMENTS

EP 2527586 11/2012

OTHER PUBLICATIONS

ISRWO International Search Report and Written Opinion for PCT/US2018/017559 dated Dec. 14, 2018.
(Continued)

*Primary Examiner* — Silvana C Runyan
(74) *Attorney, Agent, or Firm* — Thomas Rooney; C. Tumey Law Group PLLC

(57) ABSTRACT

A variety of systems, methods and compositions are disclosed, including, a method comprising: providing a fracturing fluid comprising: a carrier fluid; a micro-proppant; and a degradable micro-fiber; pumping the fracturing fluid into a wellbore penetrating a subterranean formation; and creating or extending at least one fracture in the subterranean formation. A fracturing fluid comprising: a carrier fluid; a micro-proppant; and a degradable micro-fiber. A method comprising: isolating a perforated zone in a wellbore; pumping into the perforated zone a pad fluid above a fracture gradient of a formation penetrated by the wellbore to create a plurality of fractures within the formation; pumping into the perforated zone a fracturing fluid above the fracture gradient; pumping into the perforated zone a diverting fluid below the fracture gradient; and repeating the step of pumping into the perforated zone the fracturing fluid after the step of pumping into the perforated zone the diverting fluid.

20 Claims, 2 Drawing Sheets

(51) Int. Cl.
*C09K 8/90* (2006.01)
*E21B 43/267* (2006.01)

(52) U.S. Cl.
CPC ...... *C09K 2208/08* (2013.01); *C09K 2208/28* (2013.01)

(56) References Cited

U.S. PATENT DOCUMENTS

| | | | |
|---|---|---|---|
| 7,887,846 B2 | 2/2011 | Figuly | |
| 7,931,084 B2 | 4/2011 | Nguyen et al. | |
| 8,230,925 B2 | 7/2012 | Willberg et al. | |
| 8,720,568 B2 | 5/2014 | Todd et al. | |
| 2005/0211439 A1 | 9/2005 | Willett et al. | |
| 2006/0113077 A1* | 6/2006 | Willberg | C09K 8/76 507/924 |
| 2007/0261852 A1 | 11/2007 | Surjaatmadja et al. | |
| 2008/0093073 A1* | 4/2008 | Bustos | C09K 8/80 507/221 |
| 2009/0242202 A1 | 10/2009 | Rispler et al. | |
| 2009/0264321 A1 | 10/2009 | Showalter et al. | |
| 2010/0147507 A1 | 6/2010 | Korte et al. | |
| 2011/0120712 A1 | 5/2011 | Todd et al. | |
| 2011/0303415 A1 | 12/2011 | Todd et al. | |
| 2013/0025867 A1 | 1/2013 | Sun et al. | |
| 2013/0048282 A1 | 2/2013 | Adams et al. | |
| 2013/0284437 A1 | 10/2013 | Nguyen et al. | |
| 2014/0290945 A1 | 10/2014 | Potapenko et al. | |
| 2016/0053163 A1* | 2/2016 | Nguyen | C09K 8/70 166/280.2 |
| 2016/0053599 A1 | 2/2016 | Nguyen et al. | |
| 2016/0076352 A1* | 3/2016 | Nguyen | C09K 8/80 166/280.1 |
| 2016/0122618 A1 | 5/2016 | Nguyen et al. | |
| 2016/0304770 A1* | 10/2016 | Nguyen | C09K 8/80 |
| 2016/0319189 A1 | 11/2016 | Dusterhoft et al. | |
| 2018/0306014 A1 | 10/2018 | Nguyen et al. | |
| 2020/0377781 A1 | 12/2020 | Larsen et al. | |

OTHER PUBLICATIONS

Fredd, C. N., McConnell, S. B., Boney, C. L., & England, K. W. (2001). Experimental Study of Fracture Conductivity for Water-Fracturing and Conventional Fracturing Applications. SPE Journal, 6(03), 288-298.
Office Action Summary for U.S. Appl. No. 16/959,838 dated May 26, 2021.
Office Action Summary for U.S. Appl. No. 16/959,838 dated Sep. 3, 2021.
Final Office Action Summary for U.S. Appl. No. 16/959,838 dated Jan. 24, 2022.
Notice of Allowance for U.S. Appl. No. 16/959,838 dated Apr. 13, 2022.

* cited by examiner

METHODS OF ENSURING AND ENHANCING CONDUCTIVITY IN MICRO-FRACTURES

The present application is a continuation of U.S. patent application Ser. No. 16/959,838, filed on Jul. 2, 2020, the entire disclosure of which is incorporated herein by reference.

BACKGROUND

Hydrocarbon-producing wells are often stimulated by hydraulic fracturing operations, wherein proppants may be used to hold open or "prop" open fractures created during high-pressure pumping. Once the pumping-induced pressure is removed, proppants may prop open fractures in the rock formation and thus preclude the fracture from closing. As a result, the amount of formation surface area exposed to the well bore may be increased, enhancing hydrocarbon recovery rates.

In some examples, a hydraulic fracturing operation may comprise pumping a hydraulic fracturing fluid comprising a carrier fluid and a proppant through a wellbore into a subterranean formation. The high pressure may cause the formation to fracture and may allow the fracturing fluid to enter the fractures created in the formation. In some instances, it may be advantageous to use a micro-proppant to prop open micro-fractures created in the formation. The micro-proppant may aid in additional hydrocarbon recovery by propping open small fractures not accessible by larger-sized proppants. A fracturing fluid comprising micro-proppant may expose more formation surface area to the wellbore than fracturing solely with larger-size proppant.

While micro-proppants may allow access to natural and micro-factures which are not accessible by using larger-sized proppant, the use of micro-proppants may present some challenges. By way of example, the micro-proppants may undesirably fall to one side of a horizontal fracture thereby causing the induced fractures above a proppant pack comprising the micro-proppant to close after pressure is released thereby decreasing the available conductive flow paths through the formation.

BRIEF DESCRIPTION OF THE DRAWINGS

These drawings illustrate certain aspects of the present disclosure, and should not be used to limit or define the disclosure.

DETAILED DESCRIPTION

Figure 1:
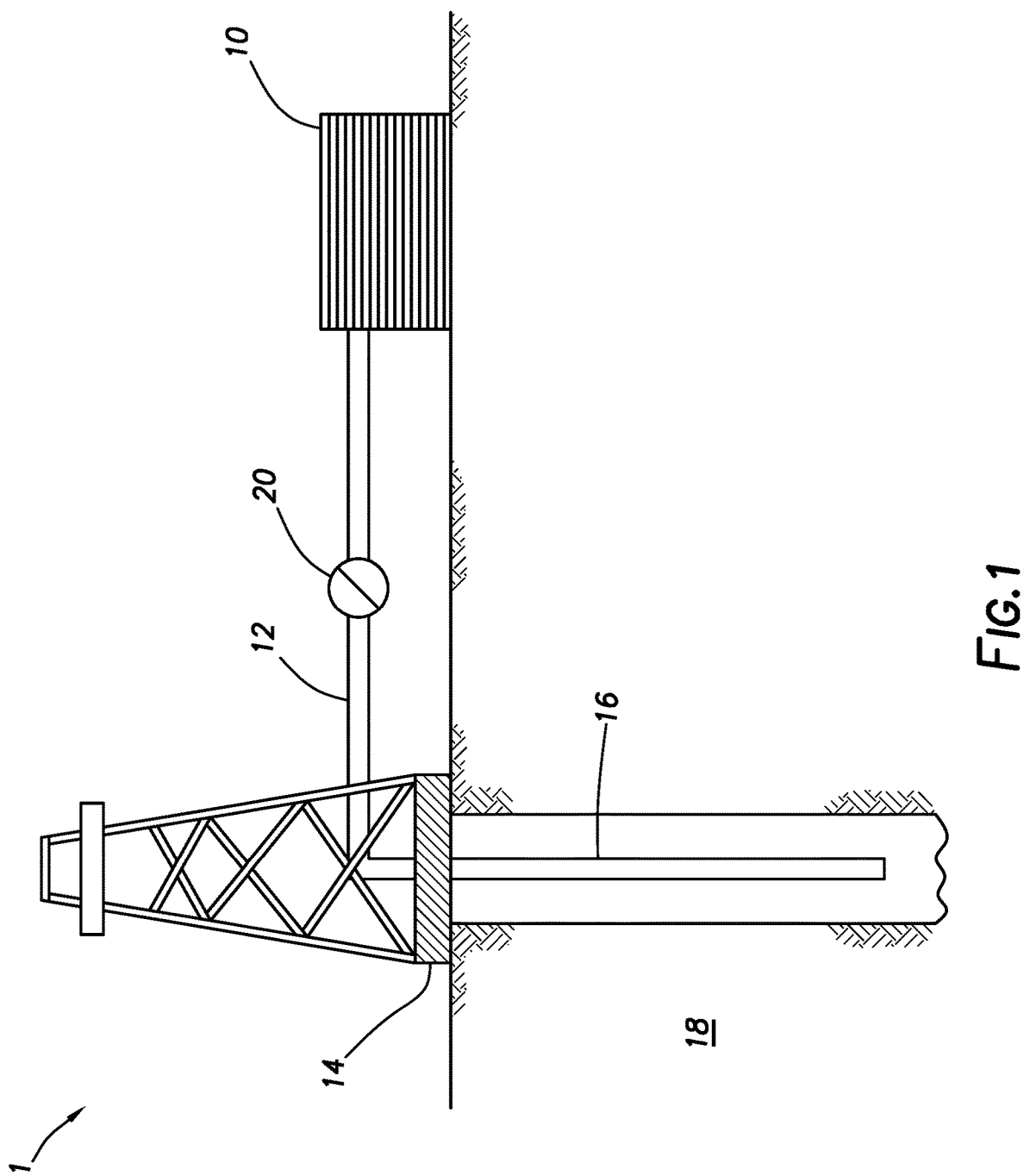
FIG. 1 is a schematic view of a well system utilized for hydraulic fracturing.

The systems, methods, and/or compositions disclosed herein may relate to subterranean operations and, in some systems, methods, and compositions, to introduction of a treatment fluid, such as a fracturing fluid, into a subterranean formation penetrated by a wellbore. In particular, a fracturing fluid may comprise a carrier fluid, a micro-proppant, and degradable micro-fibers. The formation treatment may be performed in an initial fracturing operation, or during a re-fracturing operation after an initial fracturing operation has been performed on the subterranean zone.

Examples of carrier fluids may include, without limitation, aqueous fluids, non-aqueous fluids, slickwater fluids, aqueous gels, viscoelastic surfactant gels, foamed gels, and emulsions, for example. Examples of suitable aqueous fluids may include fresh water, saltwater, brine, seawater, and/or any other aqueous fluid that may not undesirably interact with the other components used in accordance with the present disclosure or with the subterranean formation. Examples of suitable non-aqueous fluids may include organic liquids, such as hydrocarbons (e.g., kerosene, xylene, toluene, or diesel), oils (e.g., mineral oils or synthetic oils), esters, and any combination thereof. Suitable slickwater fluids may generally be prepared by addition of small concentrations of polymers to water to produce what is known in the art as "slick-water." Some suitable polymers may include polyacrylamides. Suitable aqueous gels may generally comprise an aqueous fluid and one or more gelling agents. Some gels may include polyacrylamides, polysaccharides, celluloses, xanthan, diutans, and combinations thereof. The gels may be present in any amount suitable to form a gel with desired properties. In particular, a gel loading of about 10 lbs/Mgal (10 kg per thousand m$^3$) or less. Suitable emulsions may be comprised of two immiscible liquids such as an aqueous fluid or gelled fluid and a hydrocarbon. Foams may be created by the addition of a gas, such as carbon dioxide or nitrogen. Additionally, the carrier fluid may be an aqueous gel comprised of an aqueous fluid, a gelling agent for gelling the aqueous fluid and increasing its viscosity, and, optionally, a crosslinking agent for crosslinking the gel and further increasing the viscosity of the fluid. The increased viscosity of the gelled, or gelled and crosslinked, treatment fluid, inter alia, may reduce fluid loss and may allow the carrier fluid transport significant quantities of suspended particulates. The density of the carrier fluid may be increased to provide additional particle transport and suspension in some applications.

As disclosed herein, the term "micro-proppant" refers to proppant particles having a $D_v50$ particle size ranging from about 0.01 microns to about 100 microns. The micro-proppant may have a $D_v50$ particle size from about 0.01 micron to about 100 microns, about 0.1 micron to about 20 microns, about 20 microns to about 40 microns, about 40 microns to about 60 microns, about 60 microns to about 80 microns, about 80 microns to about 100 microns, about 1 micron to about 50 microns, or about 50 microns to about 100 microns. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured by Malvern Instruments, Worcestershire, United Kingdom. In some examples, the proppant may be considered a micro-proppant. Additionally, small-sized proppant may also be used in conjunction with, or in the place of micro-proppant. As used herein, the term "small-sized proppant" refers to proppant particles with a $D_v50$ particle size ranging from about 100 microns to about 5000 microns. Alternatively, the small-sized proppant may have a $D_v50$ particle size ranging from about 500 microns to about 1000 microns, about 1000 microns to about 2500 microns, or about 2500 microns to about 5000 microns.

Proppants may comprise any suitable material. In general, proppants should have a crush strength higher than the fracture gradient of the formation so as to avoid crushing the proppant. Proppants should also be at least partially resistant to chemical attack from chemicals present in the subterranean formation and from chemicals added to the fracturing fluid. Some suitable proppants, without limitation, may include silica sand, calcium carbonate sand, resin coated sand, ceramic proppants, fly ash, glass materials, and sintered bauxite. Proppants may comprise any suitable density. In some examples, proppants may be classified as lightweight or low density and may have a density of about 1.25 g/cm$^3$ to about 2.2 g/cm$^3$. Using a low density proppant may have several advantages including, but not limited to, increased conductivity, easier placing with low viscosity fluids, and more uniform distribution within a fracture. Proppants may comprise any shape, including but not limited, to spherical, toroidal, amorphous, planar, cubic, or cylindrical. Proppants may further comprise any roundness and sphericity. Proppant may be present in the fracturing fluid in any concentration or loading. Without limitation, the proppant may be present in an amount of about 0.1 pounds per gallon ("lb/gal") (12 kg/m$^3$) to about 1 lb/gal (120 kg/m$^3$). Alternatively, about 0.1 lb/gal (12 kg/m$^3$) to about 0.2 lb/gal (24 kg/m$^3$), about 0.2 lb/gal (24 kg/m$^3$) to about 0.3 lb/gal (36 kg/m$^3$), about 0.3 lb/gal (36 kg/m$^3$) to about 0.4 lb/gal (48 kg/m$^3$), about 0.4 lb/gal (48 kg/m$^3$) to about 0.5 lb/gal (60 kg/m$^3$), about 0.5 lb/gal (60 kg/m$^3$) to about 0.6 lb/gal (72 kg/m$^3$), about 0.6 lb/gal (72 kg/m$^3$) to about 0.7 lb/gal (84 kg/m$^3$), about 0.7 lb/gal (84 kg/m$^3$) to about 0.8 lb/gal (96 kg/m$^3$), about 0.8 lb/gal (96 kg/m$^3$) to about 0.9 lb/gal (108 kg/m$^3$), or about 0.9 lb/gal (108 kg/m$^3$) to about 1 lb/gal (120 kg/m$^3$). With the benefit of this disclosure, one of ordinary skill in the art should be able to select an appropriate proppant and loading.

In some examples, the proppants may comprise surface modified proppants. Surface modified proppants may be modified to have a particular surface charge such as anionic or cationic. The proppants may be modified by any means known in the art. Some examples may include modification by a polymer, surfactant, ion exchange, or sol gel synthesis. The proppant may comprise an electrically charged surface. In some examples, the proppant surface charge may be negative or anionic. Some fracturing fluid additives may comprise surface charges that are opposite of the proppant. In some examples, clay control agents and friction reducing agents may comprise positive surface charges. In solution, the particles of opposite charges may interact which may cause the proppant to flocculate and fall out of solution. The addition of a dispersing agent may reduce the interactions between the opposite-charged molecules thereby reducing or eliminating the flocculating of proppant.

In some examples, a concentrated proppant slurry may be pre-mixed and delivered to the well site. A concentrated proppant slurry may comprise the micro-proppant and a carrier fluid. A concentrated proppant slurry may be added to the carrier fluid to create a fracturing fluid with a pre-determined loading of proppant. A concentrated proppant slurry may have some advantages over mixing proppant with the carrier fluid at a well site including, but not limited to, minimized dust and less equipment on site. The concentrated proppant slurry may be delivered by chemical tote, barrel, or any other means. In another example, the concentrated proppant slurry is made on site and mixed with the carrier fluid and degradable micro-fibers on the fly. The concentrated proppant slurry may also be stored for later use. The concentrated proppant slurry may be diluted and combined with a carrier fluid and degradable micro-fibers to form the fracturing fluid. The final physical properties of the fracturing fluid such as viscosity and density will depend on the relative amounts of carrier fluid, proppant, and degradable micro-fibers. Without limitation the viscosity may be about 3 cP to about 20 cP, about 3 cP to about 10 cP, or about 10 cP to about 20 cP. One of ordinary skill in the art, with the benefit of this disclosure, should be able to select appropriate additives and concentrations for a particular application. The fracturing fluid may also be combined with other subterranean treatments which may include, without limitation, matrix acidizing and fracture acidizing.

Degradable micro-fibers may also be included in the fracturing fluid. The degradable micro-fibers are considered "degradable" herein if the degradation is due to, in situ, a chemical and/or radical process such as hydrolysis, aminolysis, oxidation, or UV radiation. Degradable micro-fibers may comprise a degradable polymer, which may be water or hydrocarbon degradable. The degradability of a degradable polymer forming the degradable micro-fiber described herein may depend, at least in part, on its backbone structure. For instance, the presence of hydrolysable and/or oxidizable linkages in the backbone often yields a material that will degrade as described herein. The rates at which such degradable polymers may be dependent on the type of repetitive unit, composition, sequence, length, molecular geometry, molecular weight, morphology (e.g., crystallinity, size of spherulites, orientation, and the like), hydrophilicity, hydrophobicity, surface area, additives, and the like. Also, the environment into which the degradable polymer is subjected may affect how it degrades (e.g., temperature, presence of moisture, oxygen, microorganisms, enzymes, pH, and the like).

Degradable micro-fibers may comprise a water degradable polymer. The water degradable polymer may be any suitable water degradable polymer for a particular application. Some examples may include, but are not limited to, polysaccharides, chitins, chitosans, proteins, alipatic polyesters, poly(lactides), poly(glycolides), polyvinyl alcohol, poly(ε-caprolactone), poly(hydroxybutylrates), poly(anhydrides), aliphatic polycarboneates, poly(orthoesters), poly(amino acids), poly(ethylene oxides), polyphosphazenes), and combinations thereof.

In some examples, the degradable micro-fibers may be prepared from a hydrocarbon degradable thermoplastic polymer. Hydrocarbon degradable thermoplastic polymers may degrade in the presence of a hydrocarbon such as a hydrocarbon present in a subterranean formation. The hydrocarbon degradable thermoplastic polymer may include, without limitation, polystyrene, styrene methyl/methacrylate copolymer, polypropylene, polymethyl methacrylate, polyphenylene oxide, polyethylene, ethylene/propylene copolymer, polypropylene carbonate, ethylene/propylene/styrene interpolymer, and combinations thereof. In some examples, a combination of water degradable polymer and hydrocarbon degradable thermoplastic polymer may be combined in the treatment fluid.

In some examples, the degradable micro-fibers may comprise a degradable polymer that comprises carboxylic acid-derived (i.e., —COO—) functional groups on the polymer backbone. Examples of suitable degradable polymers that may be used in conjunction with the methods of this disclosure include, but are not limited to, aliphatic polyesters, poly(lactides), poly(glycolides), poly(ε-caprolactones), poly(hydroxy ester ethers), poly(hydroxybutyrates), poly(anhydrides), poly(carbonates), poly(ether esters), poly(ester amides), poly(carbamates) and copolymers, blends, derivatives, or combinations of any of these degradable polymers. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "copolymer" as used herein is not limited to copolymerization of a combination of two monomers, but includes any combination of any number of monomers, e.g., graft polymers, terpolymers and the like. For example, suitable copolymers may include an aliphatic polyester that is grafted with polyethylene oxide or polyacrylamide, or block polymers containing one or more blocks containing a carboxy (—COO—) group and another block containing a non-carboxy containing polymer segment such as polyamide, poly(alkylene oxide), poly(anhydride) polyacrylamide or poly(AMPS).

The degradable micro-fibers are considered "micro" herein if the degradable micro-fibers have a diameter ranging from about 0.01 microns to about 10 microns. In some examples, the degradable micro-fibers may have a diameter in a range of about 0.01 micron to about 10 microns. Alternatively, about 0.01 micron to about 5 microns, about 5 microns to about 10 micron, or about 2 micron to about 7 microns. The degradable micro-fibers may have a length of less than about 500 microns.

Optionally, the treatment fluid may comprise one or more additives. In some examples, the additive may comprise a dispersing agent. Dispersing agents may comprise any chemical that disrupts the surface interactions of proppant and potential flocculating agents in the treatment fluid. Some examples of dispersants without limitation may include aminosilanes, acacia gum, acrylamide copolymer, acrylate copolymers and their ammonium salts, acrylic acid homopolymer, 2-acrylamido-2-methylpropane sulfonic acid copolymer, carboxylate and sulfonate copolymer, coglycerides, dicaprylyl carbonate, maleic anhydride, phosphinocarboxylic acid, polyacrylic acid, propylheptyl caprylate, sodium acrylate homopolymer, sodium nitrite, and combinations thereof. Additional additives may include, but are not limited to, surfactants, friction reducing polymers, lubricants, and consolidating agents. The additives may be present in any concentration. Without limitation, the additives, including the dispersing agents, may be present in an amount of about 1 to about 50 gallons per thousand (GPT), about 1 to about 10 GPT, about 10 to about 20 GPT, about 20 to about 30 GPT, about 30 to about 40 GPT, about 40 to about 50 GPT, about 1 to about 25 GPT, or about 25 to about 50 GPT. GPT refers to gallons of additive per thousand gallons of fluid the additive is placed in. One of ordinary skill in the art, with the benefit of this disclosure, should be able to select appropriate additives and concentrations for a particular application.

Even further, the fracturing fluid may comprise any number of additional optional additives, including, but not limited to, salts, acids, fluid loss control additives, gas, foamers, corrosion inhibitors, scale inhibitors, catalysts, clay control agents, biocides, friction reducers, iron control agent, antifoam agents, bridging agents, dispersants, hydrogen sulfide ("$H_2S$") scavengers, carbon dioxide ("$CO_2$") scavengers, oxygen scavengers, lubricants, viscosifiers, breakers, weighting agents, inert solids, emulsifiers, emulsion thinner, emulsion thickener, surfactants, lost circulation additives, pH control additive, buffers, crosslinkers, stabilizers, chelating agents, mutual solvent, oxidizers, reducers, consolidating agent, complexing agent, particulate materials and any combination thereof. With the benefit of this disclosure, one of ordinary skill in the art should be able to recognize and select a suitable optional additive for use in the fracturing fluid.

In certain systems, methods, and/or compositions of the present disclosure, a friction reducing polymer may be used. The friction reducing polymer may be included in the fracturing fluid to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the fracturing fluid. The term "polymer" in the context of a friction reducing polymer, may be intended to refer to the acid form of the friction reducing polymer, as well as its various salts.

The friction reducing polymer may be included in the fracturing fluid, for example, in an amount of about 0.5 to about 10 GPT, about 0.5 to about 5 GPT, or about 5 to about 10 GPT. The friction reducing polymers may be included in the fracturing fluid in an amount sufficient to reduce friction without gel formation upon mixing. By way of example, the fracturing fluid comprising the friction reducing polymer may not exhibit an apparent yield point. While the addition of a friction reducing polymer may minimally increase the viscosity of the fracturing fluid, the polymers may generally not be included in the example fracturing fluid in an amount sufficient to substantially increase the viscosity. For example, when proppant is included in the fracturing fluid, velocity rather than fluid viscosity generally may be relied on for proppant transport. Additionally, the friction reducing polymer may be present in an amount in the range from about 0.01% to about 0.15% by weight of the carrier fluid. Alternatively, the friction reducing polymer may be present in an amount in the range from about 0.025% to about 0.1% by weight of the carrier fluid.

A method may comprise isolating a perforated zone in a wellbore penetrating a subterranean formation, pumping a proppant-free pad fluid into the formation at an injection rate and pressure above the fracture gradient sufficient to create or extend at least one fracture through the subterranean formation. The at least one fracture may comprise one or more dominant fractures that extends from a wellbore. The at least one fracture may also comprise one or more micro-fractures. As used herein, the term "micro-fracture" refers to a fracture or any portion of a fracture having at least one cross-sectional dimension (e.g., width, height) of less than or equal to 100 microns, thus limiting the size of particulates that can enter the micro-fracture. A first fracturing fluid comprising a carrier fluid, a micro-proppant, and degradable micro-fibers may be pumped into the subterranean formation after the pad at or above the fracture gradient to create or extend additional fractures, including, for example, additional micro fractures, and to place the micro-proppant and micro-fibers in the micro fractures. A second fracturing fluid comprising carrier fluid and small size proppant may be pumped at or above a fracture gradient after the fracturing fluid comprising the micro-proppant has been pumped, for example, to pack the larger branches and dominant fractures. A diverting fluid comprising a degradable diverter may be pumped at below the fracture gradient to temporarily seal off the perforations of propped fractures and encourage the production of new fractures by diverting flow away from sealed off perforations or fractures. The pad fluid, first fracturing fluid, second fracturing fluid, and diverting fluid may be pumped sequentially without any intervening fluids, if desired for a particular application. Each of the steps of the method may be repeated for the same zone or another zone of interest.

In another method, a perforated zone in a wellbore penetrating a subterranean formation may be isolated. A proppant-free pad fluid may be pumped into the formation at an injection rate and pressure above the fracture gradient sufficient to create or extend at least one fracture through the subterranean formation, wherein the micro fracture branches from the at least one fracture. The at least one fracture may comprise one or more dominant fractures that extends from a wellbore. The at least one fracture may also comprise one or more micro-fractures. A first fracturing fluid comprising micro-proppant without micro-fibers may be pumped into the subterranean formation at or above a fracture gradient. Thereafter, a second fracturing fluid comprising micro-fibers without micro-proppant may be pumped into the subterranean formation at or above a fracture gradient. The first fracturing fluid and second fracturing fluid may be intermittently pumped repeatedly into the subterranean formation. A third fracturing fluid comprising carrier fluid and small-size proppant may be pumped at or above a fracture gradient after the first fracturing fluid and/or second fracturing fluid micro-fiber has been pumped, for example, to pack the larger branches and dominant fractures. A diverting fluid comprising a degradable diverter may be pumped at below the fracture gradient to temporarily seal off the perforations of propped fractures and encourage the production of new fractures by diverting flow away from sealed off perforations or fractures. The pad fluid, first fracturing fluid, second fracturing fluid, and diverting fluid may be pumped sequentially without any intervening fluids, if desired for a particular application. Each of the steps of the method may be repeated for the same zone or another zone of interest.

Suitable diverting fluids may comprise a carrier fluid and a degradable diverter. Examples of carrier fluids may include, without limitation, aqueous fluids, non-aqueous fluids, slickwater fluids, aqueous gels, viscoelastic surfactant gels, foamed gels, and emulsions, for example. Suitable degradable diverting agents may comprise gels, particulates, and/or fibers that are natural or synthetic; may be of a variety of sizes; and mixtures thereof. The degradable diverters may be considered "degradable" herein if the degradation is due to, in situ, a chemical and/or radical process such as hydrolysis, aminolysis, oxidation, or UV radiation. Degradable micro-fibers may comprise a degradable polymer, which may be water or hydrocarbon degradable. Some suitable degradable diverting agents may comprise, without limitation, poly-lactic acid (PLA and poly-vinyl acetate (PVA). The degradability of a degradable polymer forming the degradable micro-fiber described herein may depend, at least in part, on its backbone structure. For instance, the presence of hydrolysable and/or oxidizable linkages in the backbone often yields a material that will degrade as described herein. The rates at which such degradable polymers may be dependent on the type of repetitive unit, composition, sequence, length, molecular geometry, molecular weight, morphology (e.g., crystallinity, size of spherulites, orientation, and the like), hydrophilicity, hydrophobicity, surface area, additives, and the like. Also, the environment into which the degradable polymer is subjected may affect how it degrades (e.g., temperature, presence of moisture, oxygen, microorganisms, enzymes, pH, and the like).

In various examples, systems configured for delivering the fracturing fluids and other servicing fluids described herein to a downhole location are described. In various examples, the systems can comprise a pump fluidly coupled to a tubular, the tubular containing a fracturing fluid comprising a carrier fluid, micro-proppant, and degradable micro-fibers.

The pump may be a high pressure pump in some examples. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some examples, the high pressure pump may be capable of fluidly conveying particulate matter, such as proppant, into the subterranean formation. Suitable high pressure pumps will be known to one having ordinary skill in the art and may include, but are not limited to, floating piston pumps and positive displacement pumps.

In other examples, the pump may be a low pressure pump. As used herein, the term "low pressure pump" will refer to a pump that operates at a pressure of about 1000 psi or less. In some examples, a low pressure pump may be fluidly coupled to a high pressure pump that is fluidly coupled to the tubular. That is, in such examples, the low pressure pump may be configured to convey the treatment fluid to the high pressure pump. In such examples, the low pressure pump may "step up" the pressure of the treatment fluid before it reaches the high pressure pump.

In some examples, the systems described herein can further comprise a mixing tank that is upstream of the pump and in which the treatment fluid is formulated. In various examples, the pump (e.g., a low pressure pump, a high pressure pump, or a combination thereof) may convey the treatment fluid from the mixing tank or other source of the treatment fluid to the tubular. In other examples, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole FIG. 1 shows an illustrative schematic of a system that can deliver fracturing fluids to a downhole location, according to one or more examples. As described herein, the fracturing fluids may comprise a carrier fluid, concentrated proppant slurry, and optional additives. It should be noted that while the FIG. 1 generally depicts a land-based system, it is to be recognized that like systems may be operated in subsea locations as well. As depicted in the FIG. 1, system 1 may include mixing tank 10, in which a fracturing fluid may be formulated. The fracturing fluid may be conveyed via line 12 to wellhead 14, where the fracturing fluid enters tubular 16, tubular 16 extending from wellhead 14 into subterranean formation 18. Upon being ejected from tubular 16, the fracturing fluid may subsequently penetrate into subterranean formation 18. Pump 20 may be configured to raise the pressure of the fracturing fluid to a desired degree before its introduction into tubular 16. The fracturing fluid may be introduced into subterranean formation 18 at any stage of a fracturing operation. For example, the fracturing fluid may be introduced into the subterranean formation 18 after one or more factures have been initiated. Fractures may be introduced for example by a pad stage. It is to be recognized that system 1 is merely exemplary in nature and various additional components may be present that have not necessarily been depicted in the FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fracturing fluid may, in some examples, flow back to wellhead 14 and exit subterranean formation 18. In some examples, the fracturing fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, this disclosure describes systems, methods, and compositions that may relate to subterranean operations. The systems, methods, and compositions may further be characterized by one or more of the following statements:

Statement 1. A method comprising: providing a fracturing fluid comprising: a carrier fluid; a micro-proppant having a $D_v50$ particle size ranging from about 0.01 microns to about 100 microns; and a degradable micro-fiber having a diameter ranging from about 0.01 microns to about 10 microns; pumping the fracturing fluid into a wellbore penetrating a subterranean formation; and creating or extending at least one fracture in the subterranean formation.

Statement 2. The method of statement 1, wherein the carrier fluid comprises an aqueous fluid, wherein the aqueous fluid comprises at least one of a gelling agent or a friction reducer.

Statement 3. The method of statement 1 or 2, wherein the gelled fluid comprises a gelling agent selected from the group consisting of polyacrylamides, polysaccharides, celluloses, xanthan, diutans, and combinations thereof.

Statement 4. The method of any of the preceding statements, wherein the gelling agent is present in an amount of about 10 pounds per thousand gallons of the carrier fluid.

Statement 5. The method of any of the preceding statements, wherein the micro-proppant has a $D_v50$ particle size of about 0.1 microns to about 50 microns.

Statement 6. The method of any of the preceding statements, wherein the micro-proppant is present in an amount of about 0.1 pounds per gallon of the fracturing fluid to about 1 pound per gallon of fracturing fluid.

Statement 7. The method of any of the preceding statements, wherein the degradable micro-fiber comprises a degradable micro-fiber selected from the group consisting of polysaccharides, chitins, chitosans, proteins, alipatic polyesters, poly(lactides), poly(glycolides), polyvinyl alcohol, poly(ε-caprolactone), poly(hydroxybutylrates), poly(anhydrides), aliphatic polycarboneates, poly(orthoesters), poly(amino acids), poly(ethylene oxides), polyphosphazenes), and combinations thereof.

Statement 8. The method of any of the preceding statements, wherein the degradable micro-fiber has a length of less than about 500 microns.

Statement 9. The method of any of the preceding statements, wherein the step of pumping comprises pumping the treatment fluid with a pump through a conduit fluidically coupled to the wellbore.

Statement 10. A fracturing fluid comprising: a carrier fluid; a micro-proppant having a $D_v50$ particle size ranging from about 0.01 microns to about 100 microns; and a degradable micro-fiber, wherein the degradable micro-fiber has a diameter in a range of about 0.01 micron to about 10 microns and a length of less than about 500 microns.

Statement 11. The fracturing fluid of statement 10, wherein the carrier fluid comprises an aqueous fluid, wherein the aqueous fluid comprises at least one of a gelling agent or a friction reducer.

Statement 12. The fracturing fluid of statement 10 or 11, wherein the gelled fluid comprises a gelling agent selected from the group consisting of polyacrylamides, polysaccharides, celluloses, xanthan, diutans, and combinations thereof Statement 13. The fracturing fluid of any one of statements 10 to 12, wherein the micro-proppant has a $D_v50$ particle size of about 1 micron to about 50 microns.

Statement 14. The fracturing fluid of any one of statements 10 to 13, wherein the micro-proppant is present in an amount of about 0.1 pounds per gallon of the fracturing fluid to about 1 pound per gallon of the fracturing fluid.

Statement 15. The fracturing fluid of any one of statements 10 to 14, wherein the degradable micro-fiber comprises a degradable micro-fiber selected from the group consisting of polysaccharides, chitins, chitosans, proteins, alipatic polyesters, poly(lactides), poly(glycolides), polyvinyl alcohol, poly(ε-caprolactone), poly(hydroxybutylrates), poly(anhydrides), aliphatic polycarboneates, poly(orthoesters), poly(amino acids), poly(ethylene oxides), polyphosphazenes), and combinations thereof.

Statement 16. A method comprising: isolating a perforated zone in a wellbore; pumping into the perforated zone a pad fluid above a fracture gradient of a subterranean formation penetrated by the wellbore to create a plurality of fractures within the subterranean formation, the plurality of fracturing comprise a dominant fracture extending from the wellbore and a micro fracture within the subterranean formation; pumping into the perforated zone a fracturing fluid above the fracture gradient wherein the treatment fluid comprises: a first carrier fluid; a micro-proppant having a $D_v50$ particle size ranging from about 0.01 microns to about 100 microns; and a degradable micro-fiber having a diameter ranging from about 0.01 microns to about 10 microns; pumping into the perforated zone a diverting fluid below the fracture gradient wherein the diverting fluid comprises: a second carrier fluid; and a degradable diverting agent; and repeating at least the step of pumping into the perforated zone the fracturing fluid after the step of pumping into the perforated zone the diverting fluid.

Statement 17. The method of statement 16, wherein the micro-proppant has a $D_v50$ particle size of about 1 micron to about 50 microns, and wherein the degradable micro-fiber has a length of less than about 500 microns.

Statement 18. The method of statement 16 or 17, wherein the micro-proppant is present in an amount of about 0.1 pounds per gallon of the fracturing fluid to about 1 pounds per gallon of the fracturing fluid.

Statement 19. The method of any of the preceding statements, wherein the degradable micro-fiber comprises a degradable micro-fiber selected from the group consisting of polysaccharides, chitins, chitosans, proteins, alipatic polyesters, poly(lactides), poly(glycolides), polyvinyl alcohol, poly(ε-caprolactone), poly(hydroxybutylrates), poly(anhydrides), aliphatic polycarboneates, poly(orthoesters), poly(amino acids), poly(ethylene oxides), polyphosphazenes), and combinations thereof.

Statement 20. The method of any of the preceding statements, further comprising pumping into the perforated zone a second fracturing fluid comprising proppant having a $D_v50$ particle size ranging from about 100 microns to about 5000 microns, wherein the second fracturing fluid is pumped into the perforated zone above the fracture gradient.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

To facilitate a better understanding of the present disclosure, the following examples of certain aspects of some of the systems, methods and cement compositions are given. In no way should the following examples be read to limit, or define, the entire scope of the disclosure.

Example 1

In this example, a polylactic acid ("PLA") degradation experiment was performed. 2 grams of PLA fiber were placed into two jars containing 100 ml of Houston tap water. One jar was placed into a 200° F. (93° C.) waterbath for 72 hours to allow for the PLA to degrade. The other jar was left on a counter at room temperature. After 72 hours, the contents of both jars were filtered through a grade 4 filter paper capable of retaining solids greater than 20-25 microns in size. The filter paper was weighed before filtration. The contents of the two jars were filtered through the filter paper and the filter paper was dried and weighed. Any undissolved PLA would remain trapped in the filter paper. The results are displayed in Table 1.

TABLE 1

| Room Temp. | PLA (g) | Filter Paper Before (g) | Filter Paper After (g) | Weight Contents (g) | % Degradation |
|---|---|---|---|---|---|
|  | 2.0 | 0.592 | 2.649 | 2.057 | 0% |
| 200° F. | 2.0 | 0.593 | 0.617 | 0.024 | 98.80% |

It was observed that the sample at 200° F. (93° C.) had a 98.8% degradation while the sample at room temperature experienced swelling and gained 0.057 grams of weight.

Example 2

Figure 2:
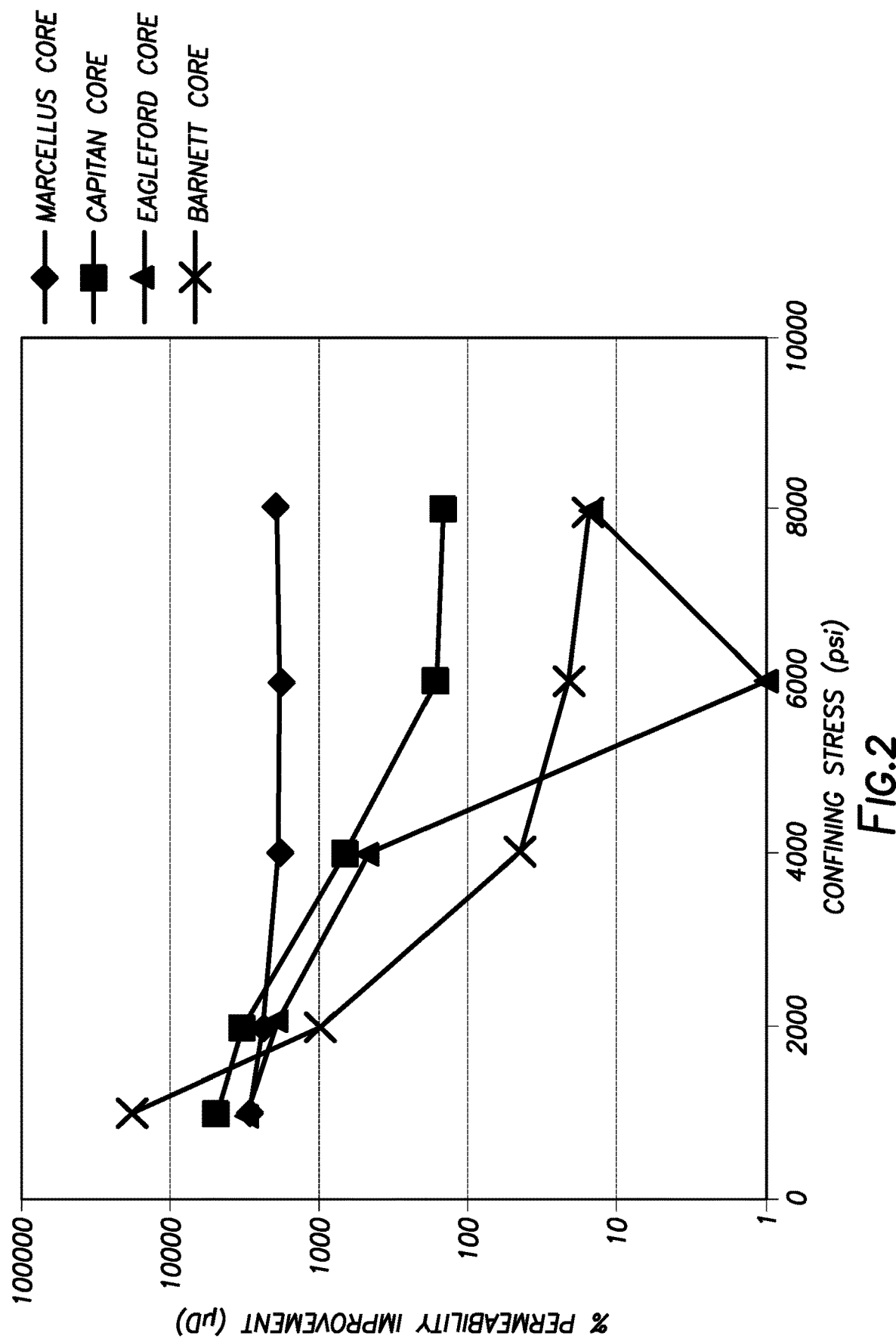
FIG. 2 is a graph of results of a split core experiment.

Split cores of formation materials sourced from Barnett, Eagle Ford, Marcellus, and Capitan formations were used to simulate the effective permeability of a micro fracture treated with a micro-proppant material at various closure stresses. The split core faces were treated with a mixture of micro-proppant and PLA micro-fibers in an aqueous solution and then reassembled. The cores were each exposed to elevated temperature and pressure to allow the PLA to break down. The cores were then tested for permeability by flowing a fluid through the cores. Additionally, untreated split cores were also exposed to a flowing fluid to establish a baseline measurement. The results are illustrated in FIG. 2. It was observed that the split cores increased in permeability by 300-400% after treatment.

What is claimed is:

1. A method comprising:
   providing a fracturing fluid comprising:
   a carrier fluid;
   a micro-proppant having a median particle size by volume of about 0.01 microns to about 100 microns;
   a degradable micro-fiber having a diameter ranging from about 0.01 microns to about 10 microns; and
   a dispersing agent;
   isolating a perforated zone in a wellbore penetrating a subterranean formation;
   pumping a proppant-free pad fluid into the subterranean formation at an injection rate and pressure above the fracture gradient sufficient to create or extend at least one fracture through the subterranean formation;
   pumping the fracturing fluid into the wellbore penetrating the subterranean formation, wherein the fracturing fluid is pumped above the fracture gradient of the subterranean formation;
   creating or extending at least one micro-fracture in the subterranean formation with the fracturing fluid, wherein the fracturing fluid is not crosslinked; and
   pumping an aqueous fluid comprising a degradable diverting agent at an injection rate below the fracture gradient of the subterranean formation to temporarily seal off the perforations of propped fractures and enhance the production of new fractures by diverting flow away from sealed off perforations or fractures.

2. The method of claim 1, wherein the carrier fluid comprises an aqueous fluid, wherein the aqueous fluid comprises at least one gelling agent or at least one friction reducer selected from the group consisting of polyacrylamides, polysaccharides, celluloses, xanthan, diutans, and combinations thereof.

3. The method of claim 1, wherein the median particle size by volume of the micro-proppant is about 0.1 microns to about 50 microns.

4. The method of claim 1, wherein the micro-proppant is present in an amount of about 0.1 pounds per gallon of the fracturing fluid to about 1 pound per gallon of fracturing fluid.

5. The method of claim 1, wherein the degradable micro-fiber comprises at least one degradable micro-fiber selected from the group consisting of polysaccharides, chitins, chitosans, proteins, alipatic polyesters, poly(lactides), poly(glycolides), polyvinyl alcohol, poly(ε-caprolactone), poly(hydroxybutylrates), poly(anhydrides), aliphatic polycarboneates, poly(orthoesters), poly(amino acids), poly(ethylene oxides), polyphosphazenes), and combinations thereof.

6. The method of claim 1, wherein the degradable micro-fiber has a length of less than about 500 microns.

7. The method of claim 1, wherein the step of pumping comprises pumping the treatment fluid with a pump through a conduit fluidically coupled to the wellbore.

8. The method of claim 1, wherein degradable micro-fiber comprises polylactic acid fibers having a diameter ranging from about 0.01 microns to about 10 microns and a length of less than about 500 microns.

9. The method of claim 1, wherein the degradable micro-fibers are degradable in the presence of aqueous solutions.

10. The method of claim 1, wherein the degradable micro-fibers are degradable in the presence of hydrocarbon-based solutions.

11. The method of claim 1, wherein the degradable micro-fibers comprise at least one degradable micro-fiber selected from the group consisting of polystyrene, styrene methyl/methacrylate copolymer, polypropylene, polymethyl methacrylate, polyphenylene oxide, polyethylene, ethylene/propylene copolymer, polypropylene carbonate, ethylene/propylene/styrene interpolymer, and combinations thereof.

12. The method of claim 1, further comprising allowing the degradable micro-fibers to degrade.

13. A method comprising:
providing a first fracturing fluid comprising:
a carrier fluid, wherein the carrier fluid is an aqueous fluid;
a micro-proppant having a median particle size by volume of about 0.01 microns to about 100 microns;
a degradable micro-fiber having a diameter ranging from about 0.01 microns to about 10 microns; and
a dispersing agent;
isolating a perforated zone in a wellbore penetrating a subterranean formation;
pumping a proppant-free pad fluid into the subterranean formation at an injection rate and pressure above the fracture gradient sufficient to create or extend at least one fracture through the subterranean formation;
pumping the first fracturing fluid into the wellbore penetrating the subterranean formation, wherein the fracturing fluid is pumped above the fracture gradient of the subterranean formation;
creating or extending at least one micro-fracture in the subterranean formation with the fracturing fluid, wherein the fracturing fluid is not crosslinked;
pumping a second fracturing fluid comprising a carrier fluid and small size proppant into the subterranean formation at an injection rate and pressure above the fracture gradient sufficient to create or extend additional fractures through the subterranean formation; and
pumping an aqueous fluid comprising a degradable diverting agent at an injection rate below the fracture gradient of the subterranean formation to temporarily seal off the perforations of propped fractures and enhance the production of new fractures by diverting flow away from sealed off perforations or fractures.

14. The method of claim 13, wherein the median particle size by volume of the micro-proppant is about 0.1 microns to about 50 microns.

15. The method of claim 13, wherein the micro-proppant is present in an amount of about 0.1 pounds per gallon of the fracturing fluid to about 1 pound per gallon of fracturing fluid.

16. The method of claim 13, wherein the degradable micro-fibers are degradable in the presence of aqueous solutions or hydrocarbon-based solutions.

17. A method comprising:
a) providing a first fracturing fluid comprising:
a carrier fluid, wherein the carrier fluid comprises an aqueous fluid, wherein the aqueous fluid comprises at least one gelling agent or a friction reducer selected from the group consisting of polyacrylamides, polysaccharides, celluloses, xanthan, diutans, and combinations thereof;
a micro-proppant having a median particle size by volume of about 0.1 microns to about 50 microns, wherein the micro-proppant is present in an amount of about 0.1 pounds per gallon of the fracturing fluid to about 1 pound per gallon of fracturing fluid;
a degradable micro-fiber having a diameter ranging from about 0.01 microns to about 10 microns, wherein the degradable micro-fibers are degradable in the presence of aqueous solutions or hydrocarbon-based solutions; and
a dispersing agent;
b) isolating a perforated zone in a wellbore penetrating a subterranean formation;
c) pumping a proppant-free pad fluid into the subterranean formation at an injection rate and pressure above the fracture gradient sufficient to create or extend at least one fracture through the subterranean formation;
d) pumping the first fracturing fluid into a wellbore penetrating a subterranean formation, wherein the fracturing fluid is pumped above the fracture gradient of the subterranean formation;
creating or extending at least one micro-fracture in the subterranean formation with the fracturing fluid, wherein the fracturing fluid is not crosslinked; and
e) pumping a second fracturing fluid comprising a carrier fluid and small size proppant into the subterranean formation at an injection rate and pressure above the fracture gradient sufficient to create or extend additional fractures through the subterranean formation;
f) pumping an aqueous fluid comprising a degradable diverting agent at an injection rate below the fracture gradient of the subterranean formation to temporarily seal off the perforations of propped fractures and enhance the production of new fractures by diverting flow away from sealed off perforations or fractures; and repeating steps b) to f) for the same perforated zone or another zone.

18. The method of claim 17, further comprising allowing the degradable micro-fibers to degrade.

19. The method of claim 17, wherein degradable micro-fiber comprises polylactic acid fibers having a diameter ranging from about 0.01 microns to about 10 microns and a length of less than about 500 microns.

20. The method of claim 17, wherein the degradable micro-fibers comprise at least one degradable micro-fiber selected from the group consisting of polystyrene, styrene methyl/methacrylate copolymer, polypropylene, polymethyl methacrylate, polyphenylene oxide, polyethylene, ethylene/propylene copolymer, polypropylene carbonate, ethylene/propylene/styrene interpolymer, and combinations thereof.

\* \* \* \* \*